May 15, 1951          T. SCHMIDT          2,553,334
WHEELBARROW STORAGE AND DISPLAY ASSEMBLY
Filed Sept. 12, 1947
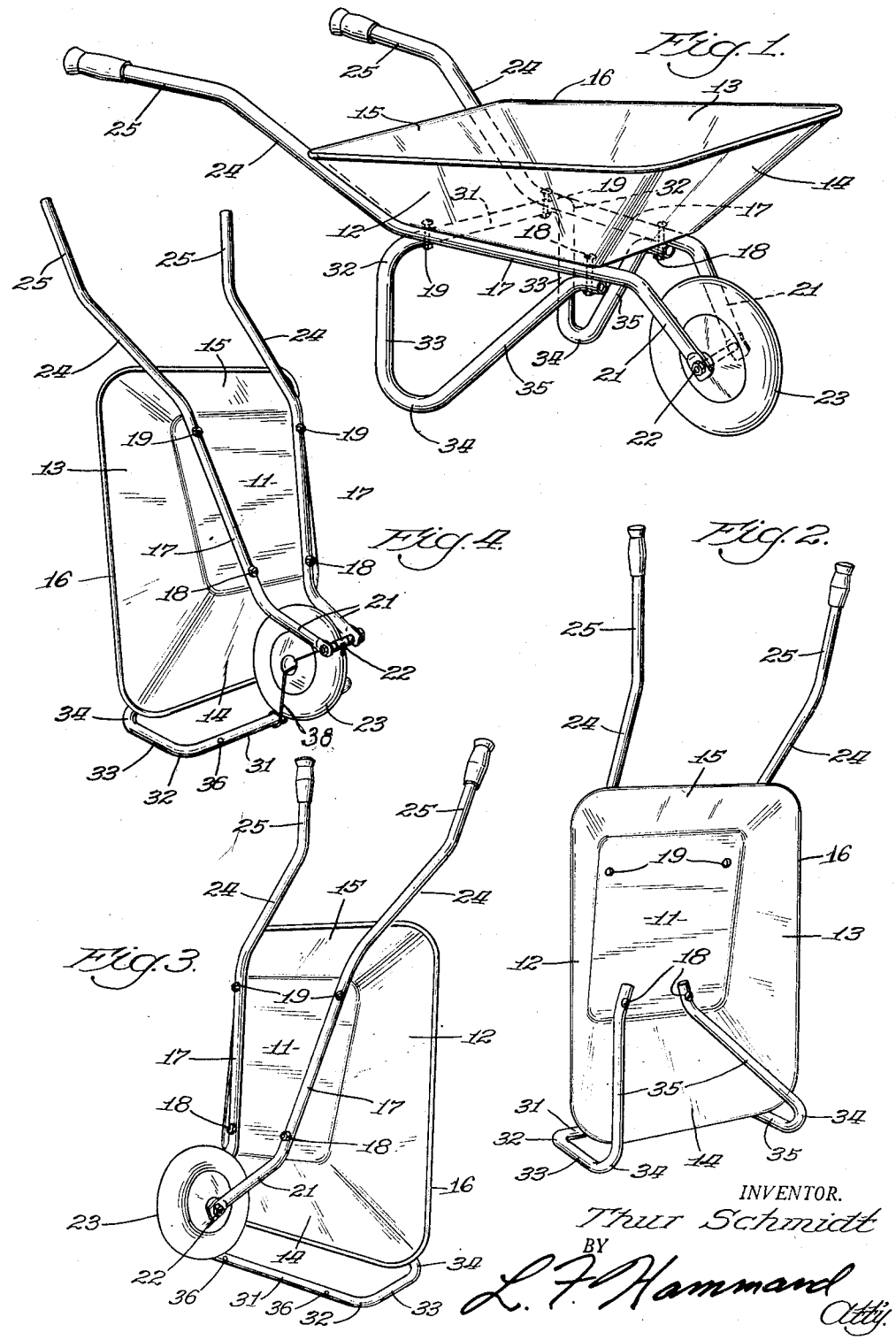
INVENTOR.
Thur Schmidt
BY
L. F. Hammand
Atty.

Patented May 15, 1951

2,553,334

UNITED STATES PATENT OFFICE 2,553,334

WHEELBARROW STORAGE AND DISPLAY ASSEMBLY

Thur Schmidt, Chicago, Ill.

Application September 12, 1947, Serial No. 773,645

5 Claims. (Cl. 280—52)

The present invention relates to wheelbarrows, and is directed to the provision of a metal utility wheelbarrow having marked features of advantage over the art in use, yet being built with its individual parts so constructed and related that it also possesses important advantages from the standpoint of efficient manufacturing, economical shipping, and convenient display for merchandising.

The primary objects of the invention are to provide greater than usual stability for the load when at rest, streamline the appearance of the unit and thus add to its salability, and simultaneously facilitate manufacture and adapt the construction of the various parts to modern mass production methods; yet, at the same time, to provide a construction such that the unit possesses minimum space requirements in shipping or storage, and includes a self contained display rack so that it will support itself in vertical position and thus be well suited to display on a crowded sales floor where space is limited.

The wheelbarrow here disclosed includes a metal tray, a rubber tired wheel, and a pair of tubular hand rails, in combination with a novel skid frame so designed and dimensionally related to the other parts that the aims of the invention are achieved and the foregoing objects accomplished. The skid frame is formed of a single piece of metal tubing having a cross bar near the back of the tray and a pair of V shaped legs, each of which includes a vertical portion extending downwardly from one of the outwardly curved ends of the cross bar, and a slanting brace extending upwardly and inwardly to a pair of bolts securing the hand rails to the bottom of the tray at a point near the front of its bottom surface.

This skid frame is adapted to an alternate method of assembly, however, in which it acts as a display rack to support the entire structure in a substantially vertical position, with the hand rails extending upwardly into the air. The parts are arranged in this relationship by removing the skid frame from its mounting bolts and replacing it with the ends of the braces inside the tray at the forward bolt holes, but with the braces extending forwardly and around the front edge of the tray, so that the legs of the frame, and the cross bar extending between them lie in a plane perpendicular to the rim of the tray. The legs and cross bar thus form a supporting base at the forward end of the tray, and the frame acts as a stand capable of supporting the entire unit in upright position.

Referring now more particularly to the drawings attached to and forming a part of this disclosure;

Figure 1 is a perspective view of a wheelbarrow constructed in accordance with the teachings of this invention;

Figure 2 is a front perspective view of the device in upright position on its supporting frame;

Figure 3 is a rear perspective view thereof, and

Figure 4 is a rear perspective view similar to Figure 3 but with the wheel in position for shipping or storage.

The wheelbarrow includes a tray having a flat bottom surface 11 curving into inclined side walls 12 and 13 and inclined front and rear walls 14 and 15. The walls all extend upwardly to a rolled edge or rim 16. The tray is carried on a pair of tubular hand rails, each having a supporting portion 17 extending across the flat bottom 11 of the tray and secured thereto by a pair of bolts 18 and 19, located in pairs of bolt holes adjacent the front and rear walls of the tray respectively. The front bolts 18 are more closely spaced from each other than the rear bolts 19, however, so that the hand rails approach each other near their forward ends, and each rail includes a downwardly extending end portion 21. An axle 22 extends between these end portions, and a rubber tired wheel 23 is mounted for rotation on the axle. The hand rails are offset upwardly at the rear of the tray so that the slanting portions 24 connect with rearwardly extending handles 25, and resilient grips 26 are preferably slipped over the ends of the handles.

The skid frame is formed of a single integral length of tubing, bent to form. It includes a straight cross bar 31 terminating in a curved portion 32 at each end. These curved portions sweep outwardly and downwardly into the vertical legs 33, which are bent into skids 34 to rest on the ground and braces 35 slanting upwardly toward the front of the tray. The cross bar 31 has a pair of bolt holes 36 near its opposite ends and these are spaced apart the same distance as the bolts 19 which secure the hand rails to the tray, so that the tray, hand rails, and skid may all be bolted together by this single pair of bolts. The forward ends of the braces 35 also have bolt holes spaced to correspond with the distance between the bolts 18, so that these bolts may unite the tray, hand rails and skid frame at the front.

The form of skid frame shown provides a particularly stable support for the tray and thus largely avoids any tendency of the load to tip, since unlike most frames of this type its width is not limited by the distance between the hand rails at the point of attachment. Instead, it is to be noted that the cross bar 31 extends beyond the hand rails on both sides, and the outward sweep of the curved portion 32 locates the legs 33 quite far apart, so that the curved skids 34 and the front wheel 23 form a three point support of unusual stability. In addition, the frame gives a pleasing, streamlined appearance to the assembly and permits assembly without any welding, riveting or other fastenings except the bolts 18 and 19.

It has been mentioned that one of the objects of the present invention was the provision of a wheelbarrow having a self contained display stand adapted to support the unit in upright position. In this disclosure this aim is achieved by designing the skid frame as a dual purpose structure, adapted for assembly in one way to act as a conventional skid frame, yet equally suited to another arrangement of parts wherein it is so related to the hand rails and tray as to support them in upright position and entirely off the floor. This arrangement of parts is shown in Figures 2 and 3.

To arrange the skid frame as a supporting stand, it is only necessary to attach it on the inside of the tray, with the cross bar 31 in front of the tray. The same bolts 18 are used and these also still act to hold the tray and hand rails together. The rear bolts 19 now join only the tray and hand rails, however.

The cross bar 31 and legs 32 may now be placed flat on any floor surface and the rest of the structure will be supported thereon in upright position. This provides an adequate merchandising display of the device with a minimum of floor space and is also of advantage in minimizing the space required in shipping or storage. In shipping, the space occupied may be further reduced by removing the front wheel, and placing it as shown in Figure 4. The parts are dimensionally related so that the periphery of the wheel exactly fits between the surfaces of the cross bar 31, the axle 22 and the inclined front wall 14 of the tray. Since the wheel also extends between the rather closely spaced ends 21 it remains snugly in position without additional fastening, although in shipment it is advisable to secure it additionally by a wire or cord 38 to insure against possible loss.

From this description it will be apparent that the teachings of this invention not only provide a wheelbarrow that is simple in construction and assembly, streamlined in appearance, well suited to modern manufacturing methods, and unusually stable in supporting its load, but also that it has marked display, storage and shipping advantages not heretofore known.

The unit may be shipped and stored with minimum space requirements when assembled as shown in Figure 4, yet it is not subject to the same hazards as usually encountered in any form of "knocked down" shipping, where parts, particularly the small parts such as bolts and nuts, are either overlooked in the original packaging or are packed in bags or envelopes that may easily become lost in transit.

In contrast to this, the units of this disclosure are shipped with every bolt, nut and washer in place and tightened down. The preassembly for shipping requires that every piece be accounted for at the time of shipment, and the fact that they may all be positively secured together eliminates any large risk of loss in transit.

The unit may be adequately displayed without the floor space a wheelbarrow ordinarily requires, so that it is well received by stores having a limited floor space. It thus enjoys a sales advantage over competing products, yet this is accomplished without the provision of any separate racks or stands, and each unit carries its own stand with it so that a dealer may make a free choice as to whether he prefers to display it in conventional position or on the stand.

The form of the invention illustrated in the drawings and described herein is the present preferred embodiment of these teachings and is believed to be well suited to the description of the advantages to be gained thereby. It is to be recognized, however, that various deviations from the exact structure shown may be indulged in without departure from the inventive concept or sacrifice of all of the advantages thereof, and it is accordingly pointed out that the scope of the invention extends to any variations or modifications of these teachings coming within the terms of the appended claims.

Having thus described the invention, what I claim as new and desire to protect by United States Letters Patent is:

1. In a wheelbarrow, the combination of a tray of sheet metal having four bolt holes therein, with the pair of front bolt holes spaced relatively close together and the rear pair spaced more widely apart; a pair of hand rails each comprising a metal tube on one side of the tray and adapted to be bolted thereto through one of the front and one of the rear holes, each hand rail including a rearwardly extending handle and a forward axle support, with an axle between the forward ends of the hand rails and a wheel rotatably mounted on the axle; together with a skid frame consisting of a cross bar extending across the lower rear edge of the tray and curving outwardly beyond the width of the hand rails, with a pair of V shaped sides having substantially vertical leg portions extending downwardly below the bottom of the tray and angle braces continuing upwardly and inwardly from the lower ends of the legs to the forward portions of the hand rails; said skid frame being formed of a single continuous length of metal tube bent to form and having bolt holes at the upper forward ends of the braces spaced to match the front bolt holes of the tray, with the braces longer than the front wall of the tray whereby the skid frame may be bolted below the tray or inverted and bolted inside the tray to overhang the front wall of the tray with the legs perpendicular to the rim of the tray to serve as a display stand.

2. In a wheelbarrow, the combination of a tray of sheet metal having four bolt holes therein, with the pair of front bolt holes spaced relatively close together and the rear pair spaced more widely apart; a pair of hand rails each comprising a metal tube on one side of the tray and adapted to be bolted thereto through one of the front and one of the rear holes, each hand rail including a rearwardly extending handle and a forward axle support, with an axle between the forward ends of the hand rails and a wheel rotatably mounted on the axle; together with a skid frame including a cross bar extending across the lower rear edge of the tray and outwardly beyond the width of the hand rails, with a pair of sides including leg ports extending downwardly below the bottom of the tray and skid portions adapted to rest on the ground, with braces extending upwardly and inwardly from the legs to the forward portions of the hand rails and having bolt holes at the upper forward ends of the braces spaced to match the front bolt holes of the tray, with the braces longer than the front wall of the tray whereby the skid frame may be bolted below the tray or inverted and bolted inside the tray to overhang the front wall of the tray with the legs perpendicular to the rim of the tray to serve as a display stand.

3. As an article of manufacture, a wheelbarrow display and storage assembly having a tray with an inner surface and an outer surface, with a pair of hand rails of tubular metal construction bolted to the outer surface of the tray and including an outwardly curved portion near the forward end of the tray and an axle bolted between the opposite ends of the rails; together with a supporting frame comprising a pair of tubular braces secured to the inner surface of the tray adjacent its forward end and extending outwardly around the front rim of the tray and curving back in a direction substantially perpendicular to the plane of the top rim of the tray, with a cross bar extending across between the two braces, and a wheel positioned between the outwardly curved portions of the hand rails and resting between the surfaces of the axle, the cross bar, and the tray to be supported thereby.

4. As an article of manufacture, a wheelbarrow display and storage assembly having a tray with an inner surface and an outer surface, a supporting frame comprising a pair of tubular braces secured to the inner surface of the tray adjacent its forward end and extending outwardly around the front rim of the tray and curving back in a direction substantially perpendicular to the plane of the top rim of the tray, with a cross bar extending across between the two braces of the frame, whereby the device may rest in stable equilibrium on a flat surface for storage or display.

5. As an article of manufacture, a wheelbarrow display and storage assembly including a tray with an inner surface and an outer surface, with a pair of hand rails secured to the outer surface of the tray and including a wheel and axle bolted between the opposite ends of the hand rails near their forward end; together with a supporting frame comprising a pair of braces secured to the inner surface of the tray adjacent its forward end and extending outwardly around the front rim of the tray and back in a direction substantially perpendicular to the plane of the top rim of the tray, whereby the device may rest in stable equilibrium on a flat surface for storage or display.

THUR SCHMIDT.

REFERENCES CITED

The following references are of record in the file of this patent:

UNITED STATES PATENTS

| Number | Name | Date |
|---|---|---|
| 945,520 | Greenwood | Jan. 4, 1910 |
| 1,031,454 | Lawrence | July 2, 1912 |
| 2,242,171 | Boyle | May 13, 1941 |

FOREIGN PATENTS

| Number | Country | Date |
|---|---|---|
| 354,514 | Italy | Nov. 25, 1937 |

OTHER REFERENCES

American Machinist, December 5, 1946, p. 101.